(12) United States Patent
Kelly et al.

(10) Patent No.: US 9,882,467 B2
(45) Date of Patent: Jan. 30, 2018

(54) METHOD FOR CONTROLLING A POWER STAGE

(71) Applicant: IDT Europe GmbH, Dresden (DE)

(72) Inventors: Anthony Kelly, Co. Limerick (IE); Adrian Ward, Co. Clare (IE)

(73) Assignee: IDT Europe GmbH, Dresden (DE)

( * ) Notice: Subject to any disclaimer, the term of this patent is extended or adjusted under 35 U.S.C. 154(b) by 0 days.

(21) Appl. No.: 14/419,561

(22) PCT Filed: May 3, 2013

(86) PCT No.: PCT/EP2013/059294
§ 371 (c)(1),
(2) Date: Feb. 4, 2015

(87) PCT Pub. No.: WO2014/023446
PCT Pub. Date: Feb. 13, 2014

(65) Prior Publication Data
US 2016/0141954 A1    May 19, 2016

(30) Foreign Application Priority Data

Aug. 6, 2012   (EP) ..................................... 12179398
Mar. 6, 2013   (EP) ..................................... 13158031

(51) Int. Cl.
| | | |
|---|---|---|
| G05F 1/10 | (2006.01) |
| H02M 3/04 | (2006.01) |
| H02M 1/36 | (2007.01) |
| H02M 3/156 | (2006.01) |
| H02M 3/157 | (2006.01) |

(52) U.S. Cl.
CPC ............. *H02M 3/04* (2013.01); *H02M 1/36* (2013.01); *H02M 3/156* (2013.01); *H02M 3/157* (2013.01)

(58) Field of Classification Search
CPC .......... H02M 1/36; H02M 3/04; H02M 3/157; H02M 3/156
USPC ........................................................ 323/234
See application file for complete search history.

(56) References Cited

U.S. PATENT DOCUMENTS

| | | | |
|---|---|---|---|
| 3,530,379 A | 9/1970 | Demerliac | |
| 6,952,093 B1 * | 10/2005 | Broach | H02M 3/156 323/282 |
| 7,630,779 B2 | 12/2009 | Kelly | |
| 2005/0270804 A1 * | 12/2005 | Liu | H02M 1/36 363/16 |

(Continued)

FOREIGN PATENT DOCUMENTS

WO        2010055556 A1    5/2010

OTHER PUBLICATIONS

Office Action issued in corresponding Taiwanese patent application No. 102124532 dated Jan. 1, 2015.

(Continued)

*Primary Examiner* — Adolf Berhane
*Assistant Examiner* — Afework Demisse
(74) *Attorney, Agent, or Firm* — Heslin Rothenberg Farley & Mesiti P.C.

(57) ABSTRACT

In a control method for a power converter, an output voltage is generated according to a control law controlling a switched power stage. During ramp up of the power converter, at least one parameter of the power stage is identified, and the control law is adapted to the identified at least one parameter of the power stage for operating the power converter.

11 Claims, 4 Drawing Sheets

(56) References Cited

U.S. PATENT DOCUMENTS

2009/0284235 A1    11/2009  Weng et al.
2011/0063881 A1*   3/2011   Dabak .................. H02M 3/157
                                                         363/39

OTHER PUBLICATIONS

Vijayan Joseph Thottuvelil, Ph.D.; "Optimizing POL Transient Response with the Tunable Loop Feature," General Electric Corporation, Jul. 10, 2013, pp. 1-6.
Intersil, Digital DC/DC PMBus 12A Module, data sheet, Available: http://www.intersil.com/content/dam/Intersil/documents/fn76/fn7669.pdf.
Kelly, et al;, "A self-compensating adaptive digital regulator for switching converters based on linear prediction," in Applied Power Electronics Conference and Exposition, 2006. APEC '06. Twenty-First Annual IEEE, 2006, p. 7 pp.
Shirazi, et al; "Autotuning Techniques for Digitally-Controlled Point-of-LoadConverters with Wide Range of Capacitive Loads," in Applied Power Electronics Conference, 2007, pp. 14-20.
Morroni, et al., "Design and Implementation of an Adaptive Tuning System Based on Desired Phase Margin for Digitally Controlled DC-DC Converters," Power Electronics, IEEE Transactions on, vol. 24, pp. 559-564, 2009.
International Search Report for PCT/EP2013/059294 dated Jan. 31, 2014.
European Search Report for EP13158031 dated Jan. 17, 2014.

* cited by examiner

METHOD FOR CONTROLLING A POWER STAGE

CROSS REFERENCE TO RELATED APPLICATIONS

Technical Field

This application is a national stage filing under section 371 of International Application No. PCT/EP2013/059294, filed on May 3, 2013, and published in English on Feb. 13, 2014 as WO 2014/023446 A2, which claims priority to European Patent Application No. 12179398.8 filed on Aug. 6, 2012, and European Patent Application No. 13158031.8 filed on Mar. 6, 2013, the entire content of said applications being hereby incorporated herein by reference.

Prior Art

In DC-DC converter applications the value of the output bulk capacitance is often uncertain. In demanding transient applications such as point of load (POL), this uncertainty can lead to excessive over/under-shoot and ringing of the controlled voltage. This is a particular problem in POL modules, but exists in many DC-DC applications.

Module manufacturers have attempted to solve this problem, for example, by allowing the module user to adjust the compensation of the POL module [1, 2].

Adaptive control techniques involve the steps of parameter identification and controller design. Researchers have used adaptive control techniques [3 to 6], using various methods of identifying the parameters of the power stage and using the estimate of those values to compensate the control loop. Addressing a wide variation of capacitive loads has been identified as a particular concern [5]. Parameter identification of capacitance can be achieved using the method taught by Demerliac et.al. in U.S. Pat. No. 3,530,379 [8].

Parameter identification has used non-parametric [5, 6] and parametric methods [3 to 5] in order to determine the parameters of the power stage. In many cases this introduces a perturbation on to the output voltage of the DC-DC converter that can be undesirable. This is a particular problem with non-parametric identification, whereby a test signal is usually introduced. In parametric identification a lack of persistent excitation may result in the need for an injected signal to improve identification. Furthermore, the quality of the estimate can be poor in circumstances in which there is a lack of persistent excitation or an unstable system, leading to a poorly compensated control system or requiring the introduction of a disturbance to excite the system. It is possible to use a signal that is already present in the system to act as a test signal. For example one can employ a voltage ramp which is often available in soft-start of a DC-DC converter [7].

The controller design step in Adaptive control involves designing compensation for the control loop using the estimated power stage parameters from the parameter identification. Several disadvantages exist with known methods including the high computational complexity involved in the calculation of the compensation parameters, making IC implementation more costly. For example, the pole-placement method is often used in the controller design step and typically, Diophantine matrix calculations must be solved to yield the compensation parameters. This involves a matrix inversion and therefore is complex in hardware. There is also the question of how to compensate the control loop before the parameter identification has been completed so that the loop behaves in a predictable manner. Oscillation of the control loop at startup is unacceptable in the system and therefore a practical adaptive controller needs to address this issue.

[1] V. J. Thottuvelil. Optimizing POL Transient Response with the Tunable LoopTM Feature. Available: http://www.lineagepower.com/oem/pdf/tunable_loop.pdf

[2] Intersil, Digital DC/DC PMBus 12A Module, data sheet, Available: http://www.intersil.com/content/dam/Intersil/documents/fn76/fn7669.pdf

[3] Kelly, "A self compensating closed loop adaptive control system," U.S. Pat. No. 7,630,779, 2005.

[4] Kelly and K Rinne, "A self-compensating adaptive digital regulator for switching converters based on linear prediction," in Applied Power Electronics Conference and Exposition, 2006. APEC '06. Twenty-First Annual IEEE, 2006, p. 7 pp.

[5] M. Shirazi, et al., "Autotuning Techniques for Digitally-Controlled Point-of-Load Converters with Wide Range of Capacitive Loads," in Applied Power Electronics Conference, 2007, pp. 14-20.

[6] J. Morroni, et al., "Design and Implementation of an Adaptive Tuning System Based on Desired Phase Margin for Digitally Controlled DC-DC Converters," Power Electronics, IEEE Transactions on, vol. 24, pp. 559-564, 2009.

[7] A. Kelly, "A self compensating closed loop adaptive control system", U.S. Pat. No. 7,630,779, 2005

[8] G. Demerliac, et al., "CAPACITANCE MEASURING APPARATUS UTILIZING VOLTAGE RAMPS OF PREDETERMINED SLOPE" U.S. Pat. No. 3,530,379, 1970.

DISCLOSURE OF THE INVENTION

It is an objective of the present invention to provide a method for controlling a power stage having a superior response over the prior art. It is furthermore an objective to provide a power converter that is robust. This objective is achieved by a method according to the independent method claim and a power converter according to the independent apparatus claim.

The present invention relates to control method for a power converter wherein an output voltage is generated according to a control law controlling a switched power stage. During ramp up of the power converter at least one parameter of the power stage is identified. The control law is adapted to the identified at least one parameter of said power stage for operating said power converter. Generally the control law is implemented in a compensator. The method adjusts the compensator parameters upon identification of the power stage parameters, using that new information to correct the compensation of the control loop in light of the identified values of the parameters, thus providing a superior response and a more robust power compensator.

A power stage may be implemented such that it comprises an inductor and an output capacitor. Then the parameter to be identified is generally the capacitance C or the ESR of the output capacitor. Moreover, identifying the inductance of the power stage may also be beneficial. Without limitation, it is clear that the control law can be adapted to any other parameters that can be readily identified.

The control law may be adapted by re-parameterizing control parameters of the control law with respect to the identified parameter by scaling the control parameters according to a deviation of the identified parameter from an expected value of the at least one parameter of said power stage. The expected value refers to a value that is to be expected from a priori information regarding the parameter like the nominal value of a capacitance or inductance.

One aspect of the method relates to normalization. The control law may be adapted by normalizing the identified control parameter by the expected value of said control parameter for obtaining a normalized identified parameter and scaling control parameters according to a deviation of the normalized identified parameter from a normalized expected value of the at least one parameter of said power stage.

One aspect of the present invention relates to the control law. The control law is generally defined by a transfer function having a plurality of zeros and poles. The plurality of zeros and poles of said transfer function may be determined on the basis of expected value for the at least one parameter of the power stage prior to identifying the at least one parameter of the power stage. After determining the at least one parameter of the power stage the plurality of zeros and poles of the transfer function is adapted according to the identified at least one parameter of the power stage.

Thus, compensating the control loop of the control law on the basis of known design equations for the expected values of power stage parameters gives a desired starting point for operation of the control loop before parameter identification has been completed and allows for operation in the event of poor quality identification.

The re-parameterized parameter can be used to yield the correct compensation parameters or pole-zero locations of the compensator transfer function. A lookup table may be employed to achieve this in a very computationally inexpensive manner. Likewise, re-parameterization in terms of other power stage parameters is possible or even performance objectives of the system such closed-loop bandwidth or output voltage deviation for a given load-step. In this way, a wide variety of variations and design objectives can be catered for with a simple process of re-parameterization, normalization and scaling. The re-parameterization and normalization may be prepared offline, whilst the scaling may be achieved online using computationally inexpensive techniques such as LUTs or CSD multipliers.

In case the parameter of the power stage is the capacitance C or the ESR of the output capacitor, then the plurality of zeros and poles of the transfer function is determined on the basis of an expected value for the capacitance C or the ESR. After identifying the capacitance C or the ESR the plurality of zeros and poles of the transfer function is adapted according to the identified capacitance C or the ESR. Without limitation, it is clear that the transfer function any other parameters that can be readily identified such as output capacitor ESR and inductance of the Inductor L.

Specifically, the plurality of zeros and poles of the transfer function is adapted for a pre-defined loop bandwidth of a closed loop of the transfer function. Alternatively, in case the control law is of type PID the proportional and integral gain is adjusted to the identified capacitance C for a pre-defined loop bandwidth. In case the parameter of the power stage is the capacitance C of the output capacitor, the proportional and integral gain is adjusted to the identified capacitance C.

In case of linear response the capacitance C is identified by measuring an average inductor current iL,AVG during ramp up time $\Delta t$ and a voltage drop of said capacitance C at the start of the ramp up and at the end of the ramp up. The capacitance C can then be computed according to C=IL, AVG*$\Delta t/\Delta V$, wherein $\Delta V$ is the difference between the voltage drop of said capacitance C between the start of the ramp up and the end of the ramp up. Thus, the capacitance C, is identified in a simple way, introducing no additional disturbance during the identification process.

In circumstances where there is a significant, unknown load current during the ramp up, it may be beneficial to correct the average inductor current such that only the current drawn by the capacitor is used for computing the capacitance. For this purpose, the average inductor current is measured when ramp up has finished so as to yield an estimated of the unknown load current during ramp up. Therefore, the capacitance can be estimated by subtracting the estimated load current from the average inductor current during ramp up.

In case the output capacitor exhibits significant ESR, the capacitance C may be identified by measuring an average inductor current iL and a voltage drop of said capacitance C during ramp up time $\Delta t$ and computing the capacitance C from a functional relationship of the average inductor current iL and the voltage drop of said capacitance C by assuming said functional relationship is exponential.

The present invention also relates to power converter comprising a switched power stage controlled by a control law implemented by a compensator. The power stage comprises means for identifying at least one parameter of said power stage during ramp-up of the power converter and means for adapting the control law of the compensator according to the identified at least one parameter of said power stage. The means for adapting the control law comprise means for adapting, means for normalizing and means for scaling a parameter of the control law.

The power stage may comprise means for identifying the capacitance C or ESR or inductance of a power stage during ramp-up of the power converter and means for adapting the control law of the compensator according to the identified capacitance C or ESR or inductance.

BRIEF DESCRIPTION OF THE DRAWINGS

The method according to the invention and the related power converter are described in more detail herein below by way of exemplary embodiments and with reference to the attached drawings, in which.

EMBODIMENTS OF THE INVENTION

Figure 1:
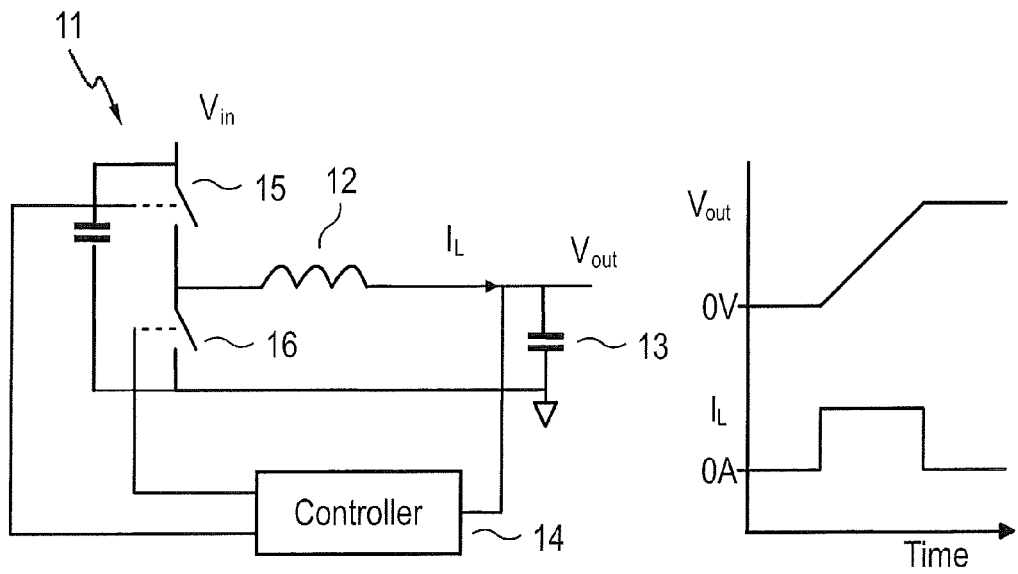
FIG. 1 shows a DC-DC power converter and its output voltage and inductor during ramp-up.

FIG. 1 shows a soft-start mechanism of a DC-DC converter comprising switched power stage 11, said power stage comprising an inductor 12 an output capacitor 13 and a compensator 14 implementing a control law for controlling the switches 15, 16 of the power stage 11. During the soft-start ramp-up the inductor current must charge the output capacitor 13. Load devices connected to the DC-DC converter are usually in active reset prior to the output voltage reaching its desired setpoint and, therefore, it can be assumed that they draw no current during the soft-start ramp up. As the total charge applied to the capacitor is proportional to the final voltage and its capacitance C, the capacitance C can be estimated as a function of the applied charge. The applied charge can easily be determined from the average current $i_{L,AVG}$ applied during the soft-start ramp and the ramp time ($\Delta T$), where $\Delta V$ is the difference between the start-of-ramp and end-of ramp voltage. The estimated capacitance C is therefore:

$$C = i_{L,AVG} * (\Delta T / \Delta V)$$

The average current $i_{L,AVG}$ used in calculation can be corrected in circumstances where there is significant load current during the ramp up by measuring the current after the ramp has finished and subtracting this value from the average ramp current value.

Figure 2:
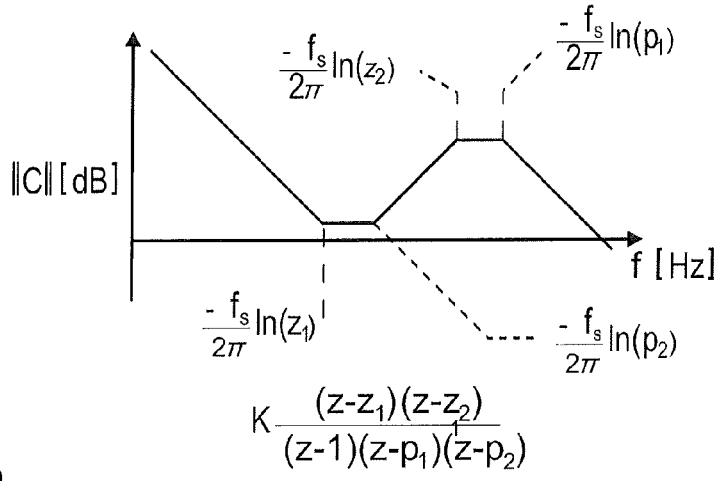
FIG. 2 shows the transfer function of a control law having two zeros and two poles.

FIG. 2 shows the magnitude versus frequency and transfer function of a discrete time "Type-3" compensator, implementing a 2-zero 2-pole plus integrator transfer function. The placement of the poles and zeros on the basis of known design equations for the expected values of power stage parameters, gives a desired starting point for operation of the control loop before parameter identification has been completed.

Figure 3:
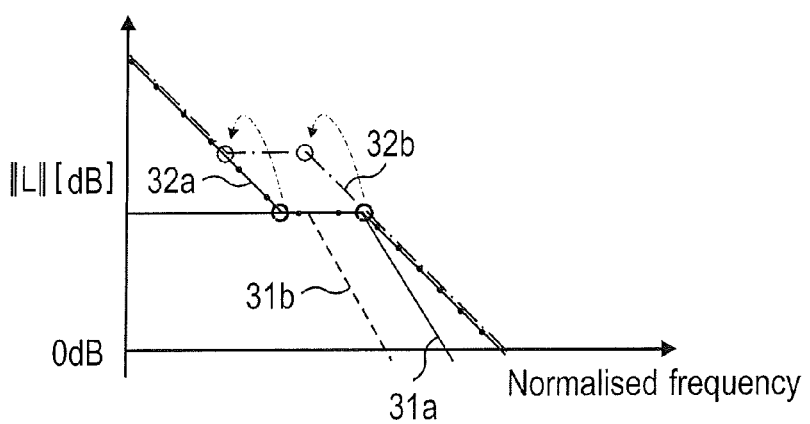
FIG. 3 shows the transfer function adjusted to different output capacitances.

The compensator has been re-parameterised in terms of the output capacitance so that scaling can be applied accordingly when a larger amount of capacitance is applied. This is illustrated in FIG. 3, where the full-line curves show the magnitude versus frequency of the power stage (line 31 a) and Loop Gain, L, (line 32 a) and indicates the expected loop behaviour. The dotted lines of FIG. 3 show how the same loop bandwidth can be achieved in a system with a larger amount of capacitance as illustrated in the dotted curve 31 b for the magnitude of the power stage and 32 b for the loop gain.

Scaling can be achieved by moving the zeros of the compensator by a corresponding amount which results in the same loop bandwidth as the original system. That is, if the capacitance value quadruples then the LC bandwidth halves and the zero locations must half in frequency compared to their original values. In this way the compensator can utilize the estimated capacitance value to modify the compensation for optimal performance by the process of normalisation and scaling with respect to the output capacitance value, C.

Figure 4:
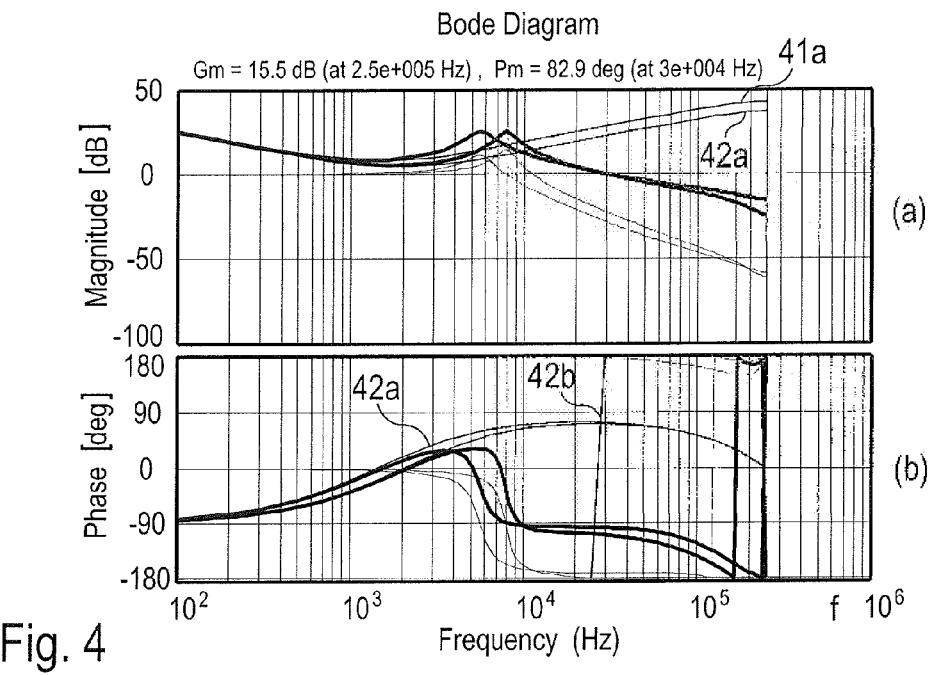
FIG. 4 shows Bode plots of the original and adjusted control law (compensator)

The adjustments are also illustrated in FIG. 4. It is apparent from the compensator adjustments (curves 41 a,b and 42 a,b), that the proportional and differential gains of a PID type may be equivalently adjusted.

Figure 5:
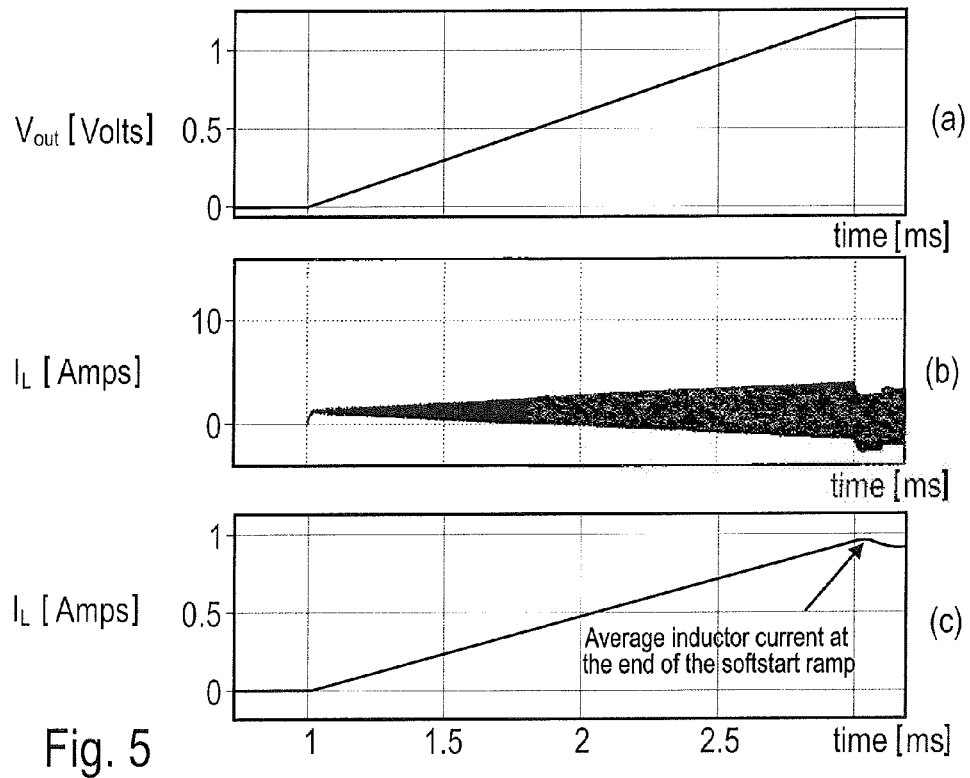
FIG. 5 shows the output voltage, inductor current and average inductor current during soft ramp-up.

The soft-start of a DC-DC converter is illustrated in FIG. 5 FIG. 5a shows the output voltage, FIG. 5b the inductor current and FIG. 5c the averaged inductor current, as a function of time. The average inductor current at the end of the soft-start ramp is shown to peak indicating the capacitors are fully charged.

Figure 6:
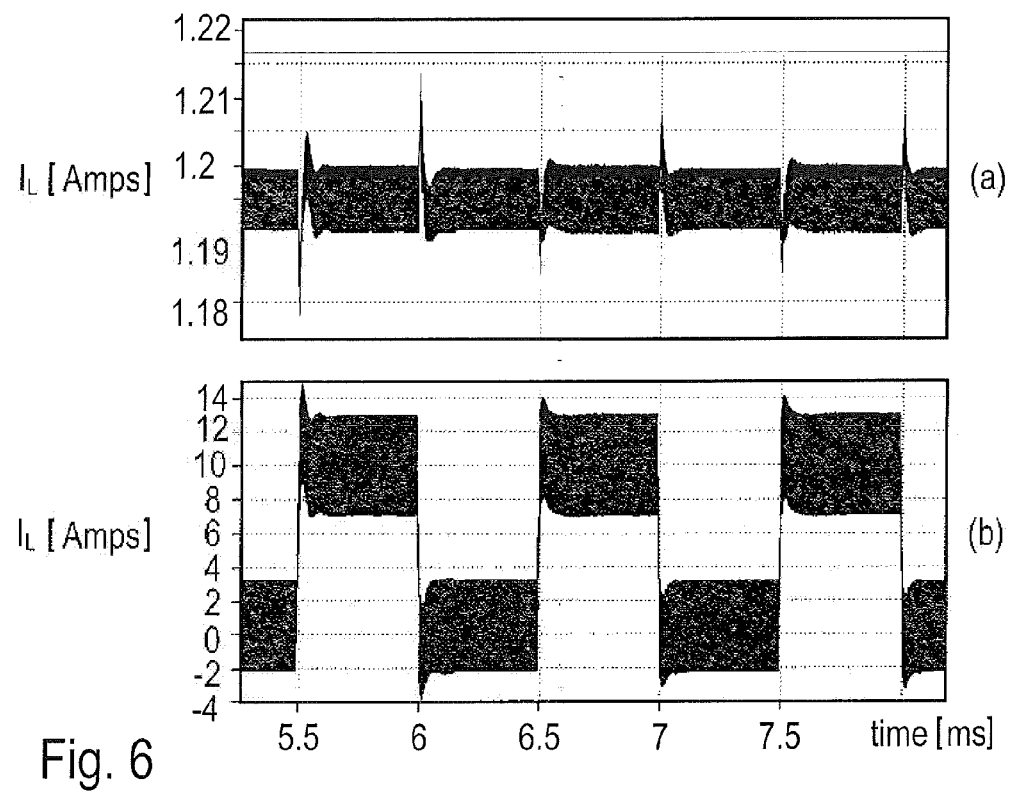
FIG. 6 shows the response of a DC-DC power converter using an updated control law(compensator) adapted to the identified capacitance.

In order to further illustrate the advantages of the invention FIG. 6 shows the power stage identification and control system of an exemplary DC-DC converter, whereby the capacitance is identified as being 4000 micro-Farads according to the average inductor current at the end of the soft-start ramp. In this case the loop has been compensated assuming 1000 micro-Farads. The identified capacitance value is updated after 6 ms. It can be seen that the transient response is improved by the identification of the actual output capacitance of the system.

Returning to FIG. 5, it is apparent that no disturbance has been introduced into the control loop to identify the capacitance.

Figure 7:
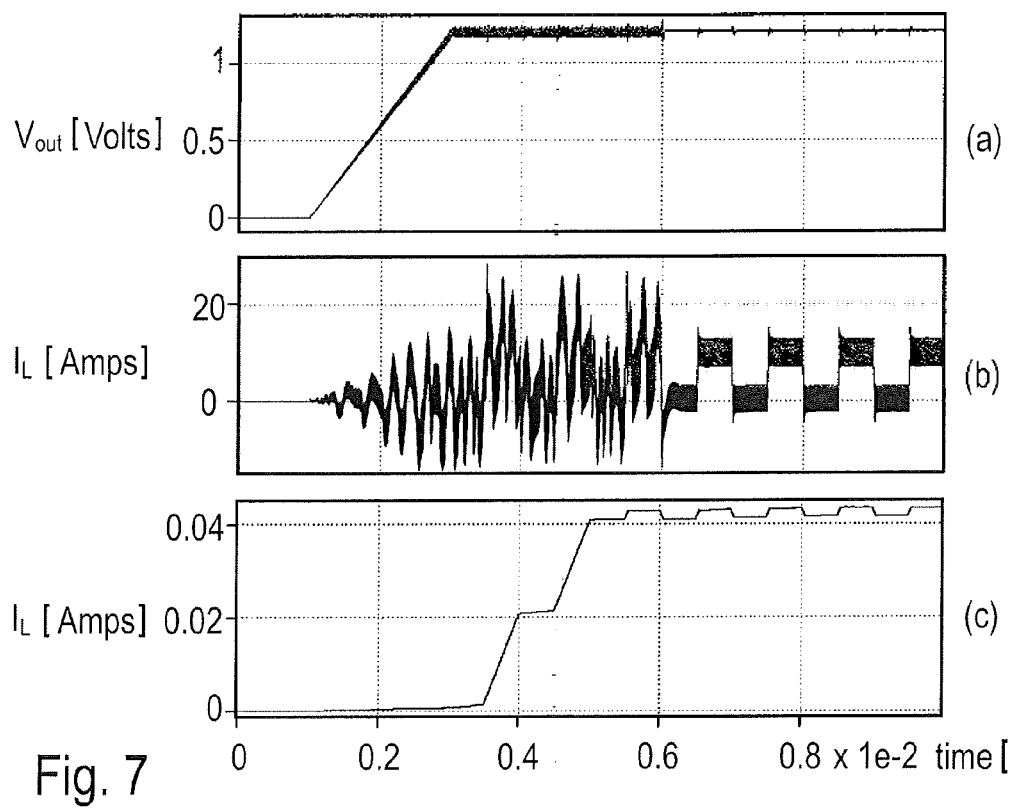
FIG. 7 shows the response of an unstable DC-DC power converter.
Figure 8:
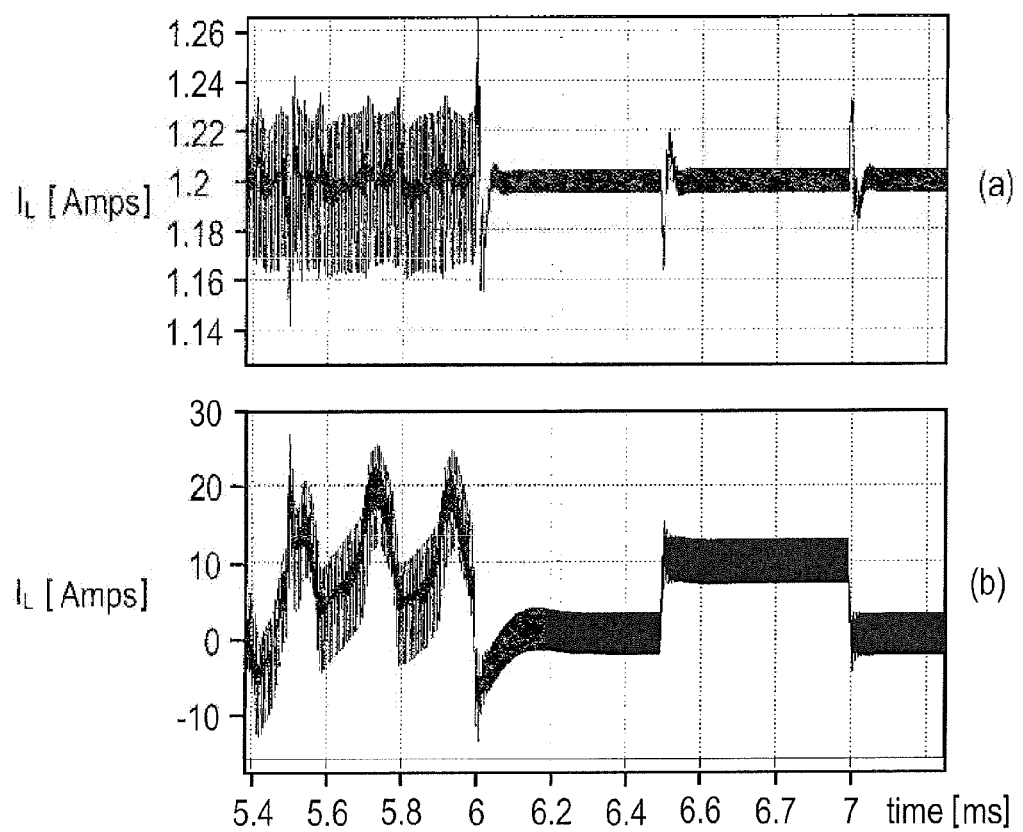
FIG. 8 shows the stabilization of the response of the unstable DC-DC power converter in case its control law (compensator) is adapted to the identified capacitance

Clearly it is particularly advantageous to correctly identify a control system's output capacitance when it is below the critical value for stability, and correct the compensation to ensure stability. FIG. 7 shows that this method works equally well on an unstable DC-DC converter whereby the average inductor current during the soft-start ramp is unaffected by the instability, ensuring the accuracy of identification. FIG. 8 shows that stability of the system is restored once the identified capacitance value is used to adjust the loop compensation after 6 ms.

Hence, the combination of capacitance identification and a simple means of compensation adjustment from a predetermined compensator conveys significant advantages in the performance and cost of a DC-DC converter, obviating the need for complex identification and compensation calculation algorithms. Furthermore, the identification is shown to operate in the presence of an unstable system, which can be a problem with other methods of identification.

The invention claimed is:

1. A control method for a power converter wherein an output voltage is generated according to a control law controlling a switched power stage, wherein during a soft start ramp up of the power converter prior to the output voltage reaching its desired set-point at least one parameter of the power stage is identified and wherein said control law is adapted to said identified at least one parameter of said power stage for operating said power converter, wherein said control law is defined by a transfer function having a plurality of zeros and poles, wherein the power stage comprises an inductor and an output capacitor and wherein the parameter of the power stage to be identified is the capacitance C or the ESR of the output capacitor or the inductance of the output inductor, wherein the plurality of zeros and poles of said transfer function is determined on the basis of a expected value for the capacitance C or the ESR or the inductance, wherein the capacitance C is determined by measuring an average inductor current $i_{L,AVG}$ during ramp up time $\Delta t$ and a voltage drop of said capacitance C at the start of the ramp up and at the end of the ramp up and computing $C = i_{L,AVG} * \Delta t / \Delta V$, wherein $\Delta V$ is the difference between the voltage drop of said capacitance C between the start of the ramp up and the end of the ramp up, and wherein the average inductor current $i_{L,AVG}$ is corrected by measuring the average inductor current when ramp up has finished and subtracting said average inductor current measured after ramp up from the average inductor current during ramp up.

2. The control method according to claim 1, wherein adapting the control law comprises re-parameterizing control parameters of the control law with respect to the identified parameter, and scaling control parameters according to a deviation of the identified parameter from an expected value of the at least one parameter of said power stage.

3. The control method according to claim 2, wherein adapting the control law further comprises normalizing the identified control parameter by the expected value of said control parameter for obtaining a normalized identified parameter and scaling control parameters according to a deviation of the normalized identified parameter from a normalized expected value of the at least one parameter of said power stage.

4. The control method according to claim 3, wherein re-parameterizing and/or normalizing is prepared offline, whilst the scaling is performed online using lookup tables or canonic sign digit multipliers.

5. The control method according to claim 1, wherein said plurality of zeros and poles of said transfer function is determined on the basis of an expected value for the at least one parameter of said power stage prior to identifying the at least one parameter of the power.

6. The control method according to claim 5, wherein after determining the at least one parameter of the power stage the plurality of zeros and poles of the transfer function is adapted according to the identified at least one parameter of the power stage.

7. The control method according to claim 6, wherein a gain or a zero or a pole of the transfer function is scaled according to the deviation of the identified parameter from an expected value of the at least one parameter of said power stage.

8. The control method according to claim 5, wherein the plurality of zeros and poles of the transfer function is adapted for a pre-defined loop bandwidth of a closed loop of the transfer function.

9. The control method according to claim 1, wherein the capacitance C is identified by measuring an average inductor current $i_{L,AVG}$ and a voltage drop of said capacitance C during ramp up time $\Delta t$ and computing the capacitance C from a functional relationship of the average inductor current $i_{L,AVG}$ and the voltage drop of said capacitance C by assuming said functional relationship is exponential.

10. The control method according to claim 1, wherein the control law is of type PID and wherein proportional and integral gain is adjusted to the identified capacitance C or ESR or inductance for a pre-defined loop bandwidth.

11. A power converter comprising a switched power stage controlled by a control law implemented by a compensator, means for identifying at least one parameter of said power stage during a soft start ramp-up of the power converter prior to the output voltage reaching its desired set-point and means for adapting the control law of the compensator according to the identified at least one parameter of said power stage, wherein the means for adapting the control law comprise means for adapting, means for normalizing and means for scaling a parameter of the control law, wherein said control law is defined by a transfer function having a plurality of zeros and poles, wherein the power stage comprises an inductor and an output capacitor and wherein the parameter of the power stage to be identified is the capacitance C or the ESR of the output capacitor or the inductance of the output inductor, wherein the plurality of zeros and poles of said transfer function is determined on the basis of a expected value for the capacitance C or the ESR or the inductance, wherein the capacitance C is determined by measuring an average inductor current $i_{L,AVG}$ during ramp up time $\Delta t$ and a voltage drop of said capacitance C at the start of the ramp up and at the end of the ramp up and computing $C = i_{L,AVG} * \Delta t / \Delta V$, wherein $\Delta V$ is the difference between the voltage drop of said capacitance C between the start of the ramp up and the end of the ramp up, and wherein the average inductor current $i_{L,AVG}$ is corrected by measuring the average inductor current when ramp up has finished and subtracting said average inductor current measured after ramp up from the average inductor current during ramp up.

* * * * *